United States Patent
Colombo et al.

(10) Patent No.: US 9,169,864 B2
(45) Date of Patent: Oct. 27, 2015

(54) LOCK RING AND THREADED STUD

(71) Applicant: AGUSTAWESTLAND S.p.A., Samarate (IT)

(72) Inventors: Dario Colombo, Uboldo (IT); Giuseppe Gasparini, Gallarate (IT)

(73) Assignee: AGUSTAWESTLAND S.P.A., Samarate (IT)

( * ) Notice: Subject to any disclaimer, the term of this patent is extended or adjusted under 35 U.S.C. 154(b) by 274 days.

(21) Appl. No.: 13/711,113

(22) Filed: Dec. 11, 2012

(65) Prior Publication Data

US 2013/0145604 A1 Jun. 13, 2013

(30) Foreign Application Priority Data

Dec. 12, 2011 (EP) .................................. 11425297

(51) Int. Cl.
*F16B 39/10* (2006.01)
*F16B 39/282* (2006.01)

(52) U.S. Cl.
CPC ............... *F16B 39/282* (2013.01); *F16B 39/10* (2013.01); *Y10T 29/49948* (2015.01)

(58) Field of Classification Search
CPC ...... F16B 39/10; F16B 39/103; F16B 39/105; F16B 35/041; Y10T 403/7047; Y10T 403/7051; Y10T 403/7061
See application file for complete search history.

(56) References Cited

U.S. PATENT DOCUMENTS

| | | | | | |
|---|---|---|---|---|---|
| 2,400,348 | A | * | 5/1946 | Greene | 411/107 |
| 2,788,830 | A | * | 4/1957 | Rosan | 411/259 |
| 3,124,189 | A | | 3/1964 | Dietlein | |
| 3,179,144 | A | * | 4/1965 | Brown | 411/178 |
| 3,259,163 | A | * | 7/1966 | Rosan et al. | 411/109 |
| 3,381,362 | A | * | 5/1968 | Church et al. | 29/432.2 |
| 3,395,934 | A | * | 8/1968 | Rosan et al. | 285/23 |
| 3,630,252 | A | * | 12/1971 | Rosan et al. | 411/335 |
| 3,702,707 | A | * | 11/1972 | Rosan, Jr. | 285/23 |
| 3,720,969 | A | * | 3/1973 | Rosan et al. | 470/2 |
| 4,621,961 | A | * | 11/1986 | Gulistan | 411/352 |
| 4,787,790 | A | * | 11/1988 | Shirai | 411/109 |
| 4,848,405 | A | * | 7/1989 | Albrecht | 137/884 |
| 5,435,678 | A | * | 7/1995 | Stencel | 411/178 |
| 6,079,920 | A | * | 6/2000 | Dispenza | 411/107 |
| 7,073,997 | B2 | * | 7/2006 | Kovac | 411/512 |
| 7,828,015 | B2 | * | 11/2010 | Albrecht et al. | 137/884 |

FOREIGN PATENT DOCUMENTS

| | | |
|---|---|---|
| EP | 0097111 | 12/1983 |
| GB | 128880 | 7/1919 |
| GB | 878470 | 9/1983 |

* cited by examiner

*Primary Examiner* — Daniel Wiley
(74) *Attorney, Agent, or Firm* — Leason Ellis LLP

(57) ABSTRACT

A lock ring for securing a threaded stud to a first member, the ring having a first surface defining the ring on the side facing a first axis of symmetry of the ring, and in which a toothed impression is formed when it is forced onto a toothed portion of the threaded stud; and a conical second surface defining the ring on the opposite side to the first axis, and which is forced inside the first member.

10 Claims, 5 Drawing Sheets

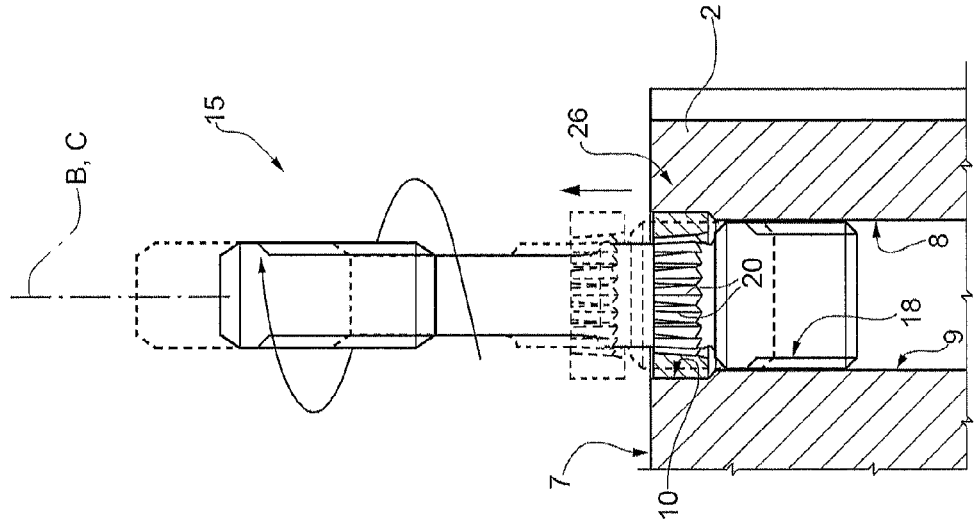
FIG. 9
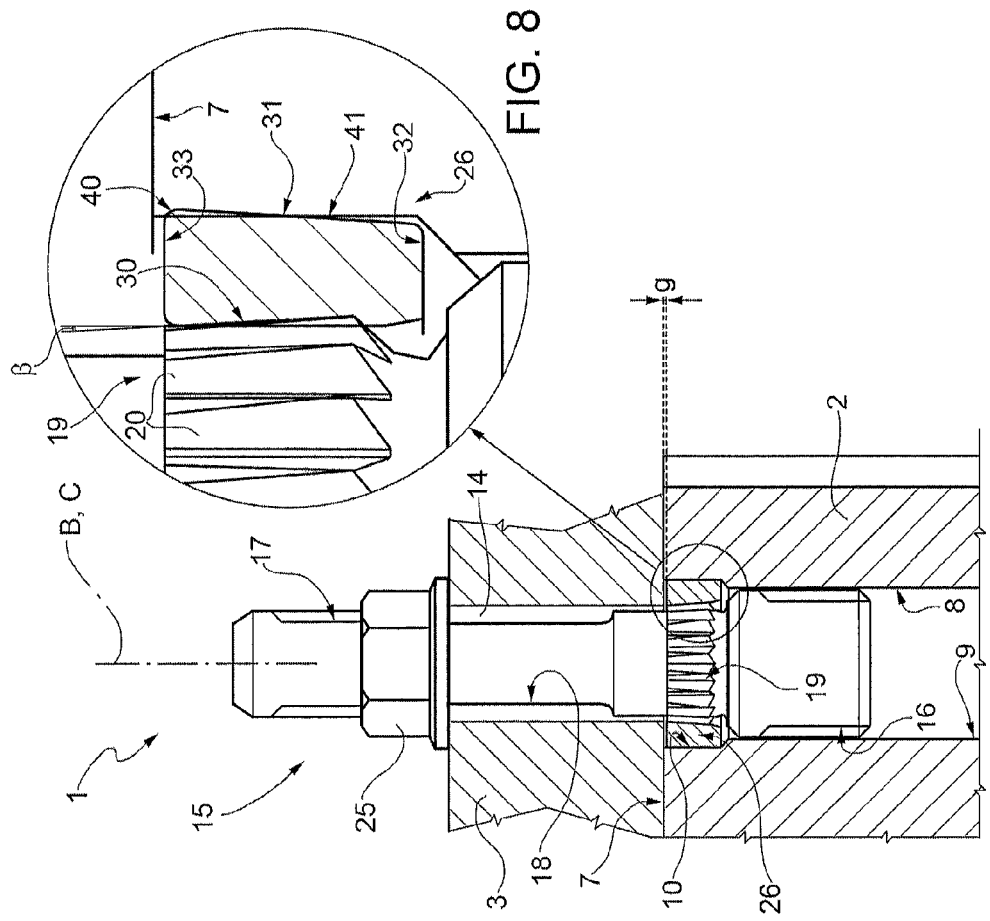
FIG. 8
FIG. 7

LOCK RING AND THREADED STUD

The present invention relates to a lock ring for securing a threaded stud to a first member.

The present invention also relates to a method of connecting a first and second member by means of a threaded stud.

BACKGROUND OF THE INVENTION

Connecting a first and second member releasably using threaded studs is known.

The first member may for example be an aluminium or magnesium housing, and the second member a helicopter lubricating oil tank casing.

Threaded studs are known which substantially comprise:
a first thread which screws onto a first nut screw on the housing;
a second thread onto which screws a lock member such as a nut; and
a non-threaded portion between the first and second thread and which fits loosely through a seat in the casing.

The nut is screwed to connect, and unscrewed to disconnect, the housing and the casing.

When screwing and unscrewing the nut, friction between the nut thread and the second thread may also result in undesired rotation of the stud with respect to the housing.

To prevent this from happening, toothed cadmium-plated steel lock washers are employed.

More specifically, the toothed washer is housed inside a seat on the housing, and comprises a first and opposite second toothed surface.

The radially inner first surface of the washer engages teeth on the stud, which are housed inside the seat, are interposed axially between the first thread and the intermediate portion of the stud, and comprise a number of teeth coaxial with the longitudinal axis of the stud.

Because the toothed lock washer is made of steel, i.e. harder material than the aluminium or magnesium the housing is made of, the radially outer second surface of the washer forms teeth on the inner surface of the seat on the housing.

The stud is thus prevented from rotating with respect to the housing by the friction produced between the second surface of the washer and the seat on the housing, and between the first surface of the washer and the stud teeth.

The second surface of the toothed washer cutting into the seat on the housing may produce microcracks.

A need is felt within the industry to minimize the risk of microcracks forming on the housing.

Contact between two dissimilar materials, such as the steel of the toothed washer and the aluminium/magnesium of the housing seat, may also initiate corrosion phenomena.

A need is felt within the industry to minimize the risk of initiating corrosion phenomena.

Finally, to remove the stud, e.g. in the event of damage, the toothed washer must also be removed.

This calls for the use of a production milling machine or, if the stud is also assembled, a special cutter fitted to a handdrill.

A need is felt within the industry for a simple, low-cost way of removing studs with no need for complex tools.

SUMMARY OF THE INVENTION

It is an object of the present invention to provide a lock ring for securing the stud to the housing, and designed to achieve at least one of the above goals cheaply and easily.

According to the present invention, there is provided a lock ring for securing a threaded stud to a first member, as claimed in claim 1.

The present invention also relates to a method of connecting a first and second member by means of a threaded stud, as claimed in claim 13.

BRIEF DESCRIPTION OF THE DRAWINGS

A preferred non-limiting embodiment of the present invention will be described by way of example with reference to the accompanying drawings, in which:

FIG. 7 shows the FIG. 6 threaded stud and lock ring fixed to the housing;

FIG. 8 shows enlarged details of FIG. 7;

FIG. 9 shows removal of the FIG. 7 threaded stud and lock ring from the housing.

DETAILED DESCRIPTION OF THE INVENTION

Figure 1:
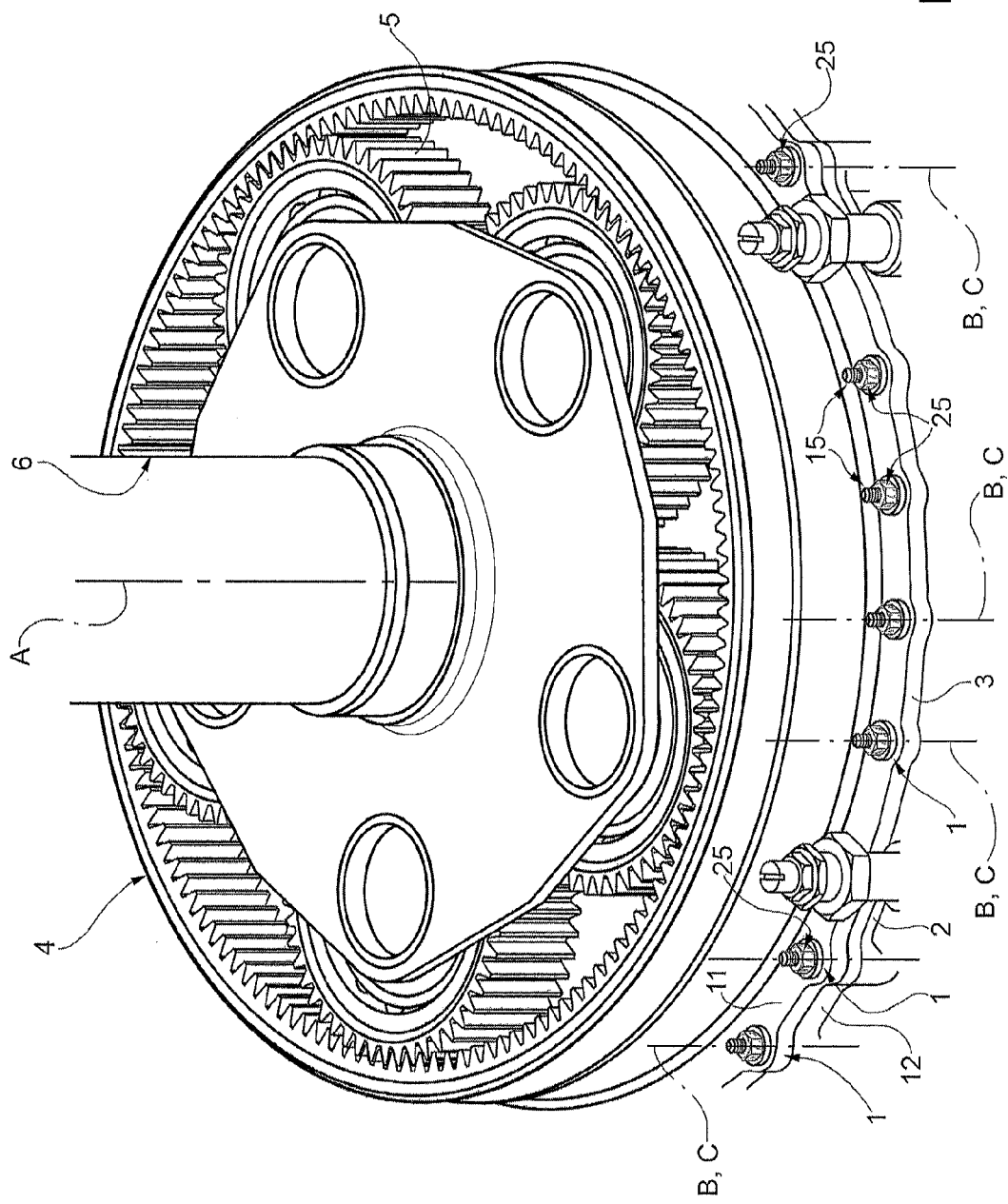
FIG. 1 shows a view in perspective of a helicopter transmission comprising a number of connection assemblies, each comprising a lock ring and a threaded stud in accordance with the present invention.

Number 1 in FIG. 1 indicates an assembly for connecting a housing 2 and casing 3 housing a helicopter transmission 4, of which are shown only an epicyclic gear train 5, and an output shaft 6 extending from epicyclic gear train 5.

Housing 2 and casing 3 extend coaxially about an axis A.

Housing 2 and casing 3 are connected by a number of connection assemblies 1 interposed between superimposed circumferential edges 11, 12 of housing 2 and casing 3.

In the example shown, housing 2 is made of aluminium or magnesium.

In the following description, reference is made to one connection assembly 1, all the others being identical.

Connection assembly 1 (FIG. 7) substantially comprises a threaded stud 15 extending along an axis B; a nut 25; and a lock ring 26.

Threaded stud 15 (FIGS. 5, 6 and 7) substantially comprises:
a thread 16 which screws onto a nut screw defined by housing 2;
a thread 17 to which nut 25 screws with a given tightening torque; and
a non-threaded portion 18 interposed axially between threads 16 and 17 and loosely engaging a seat 14 defined by casing 3.

Threaded stud 15 also comprises a toothed portion 19 interposed between thread 16 and portion 18.

More specifically, toothed portion 19 comprises a number of teeth 20 arranged circumferentially and symmetrically about axis B.

A surface of toothed portion 19, radially outwards with respect to axis B, is advantageously conical.

More specifically, teeth 20 of toothed portion 19 taper from thread 16 towards axis B and thread 17.

The taper β (FIG. 8) of teeth 20 of toothed portion 19, i.e. the angle between the longitudinal direction of teeth 20 and axis B, ranges between 0.5 and 2 degrees, and is preferably 1 degree.

Ring 26 is designed to prevent threaded stud 15 from rotating about axis B and with respect to housing 2 when screwing or unscrewing nut 25 to or from thread 17.

Ring 26 extends along an axis C.

Figure 2:
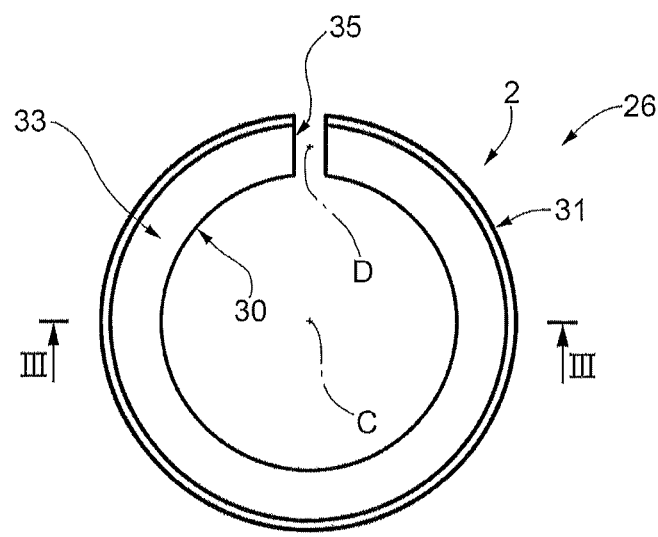
FIG. 2 shows an enlarged top plan view of the FIG. 1 lock ring.

Advantageously, ring 26 (FIGS. 2 to 4) comprises:

- a surface 30 defining ring 26 on the side facing axis C, and in which a toothed impression 27 (FIG. 4) is formed when it is forced onto toothed portion 19 of threaded stud 15; and
- a truncated-cone-shaped surface 31 defining ring 26 on the opposite side to axis C, and which is forced onto housing 2.

Ring 26 also comprises two end surfaces 32 and 33 interposed between surfaces 30 and 31 and in respective planes perpendicular to axis C.

Surface 31 tapers from surface 33 towards axis C and surface 32, and is symmetrical with respect to axis C.

More specifically, the taper α (FIG. 6) of surface 31, i.e. the angle between axis C and the trace of surface 31 sectioned in a plane parallel to axis C, ranges between 0.5 and 2 degrees, and is preferably 1 degree.

Figure 3:
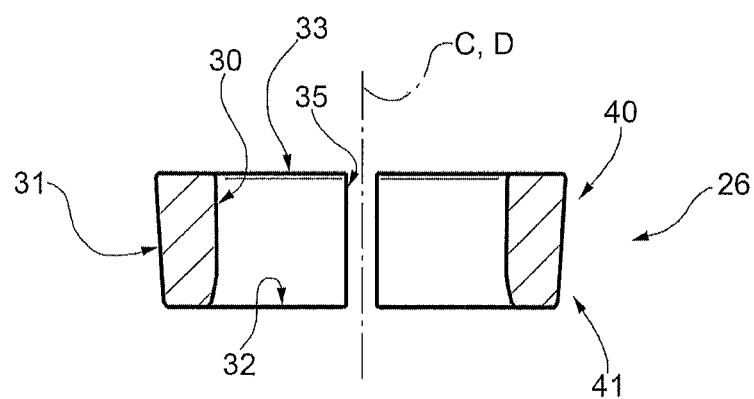
FIG. 3 shows a section along line III-III in FIG. 2.
Figures 4, 5:
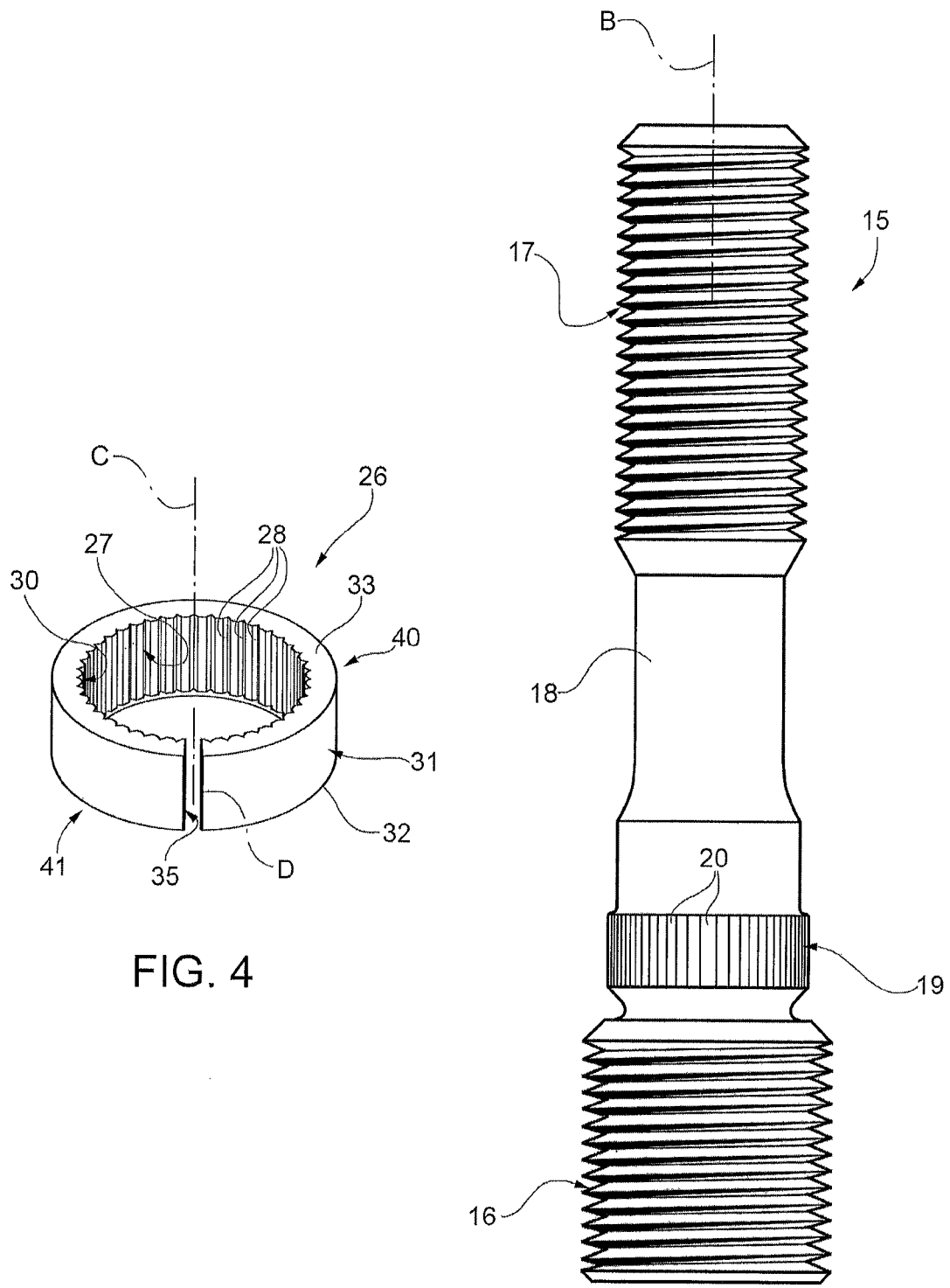
FIG. 4 shows a view in perspective of the FIG. 1-3 ring after it has been fitted to a first member and forced onto the FIG. 1 threaded stud.
FIG. 5 shows an enlarged front view of the FIG. 1 threaded stud.

From surface 33 to surface 32, parallel to axis C, ring 26 comprises a half 40 and a half 41 (FIGS. 3 and 4).

Housing 2 is bounded, on the end facing casing 3, by a wall 7 perpendicular to axis C.

Housing 2 comprises a hole 8, of axis C, comprising a portion 9 defining the nut screw; and a seat 10 interposed axially between portion 9 and wall 7.

Surface 31, measured at surface 33, is larger in diameter than seat 10 (FIG. 8).

Surface 31, measured at surface 32, is smaller in diameter than seat 10.

At a mid-surface between surfaces 33 and 32, surface 31 is preferably the same diameter as seat 10.

The axial half 41 of ring 26 is thus freely insertable inside seat 10, and axial half 40 is inserted interferentially inside seat 10.

Surface 30 is cylindrical and of axis C.

Ring 26 also comprises a gap 35 to one side of axis C.

More specifically, gap 35 extends the entire axial length of ring 26, from surface 32 to surface 33, and radially through the full thickness of ring 26, from surface 30 to surface 31.

Gap 35 extends along a respective axis D parallel to and distanced from axis C.

Impression 27 (FIG. 4) comprises a number of grooves 28 arranged circumferentially about axis C and converging towards axis B and surface 33 from surface 32.

Each groove 28 is formed by a respective tooth 20 toothed portion 19, and extends from surface 32 towards surface 33 by a length less than the length of ring 26 parallel to axis C.

Ring 26 is preferably made of a similar material, i.e. aluminium or magnesium, as housing 2.

In actual use, thread 16 is screwed to the nut screw on housing 2.

Figure 6:
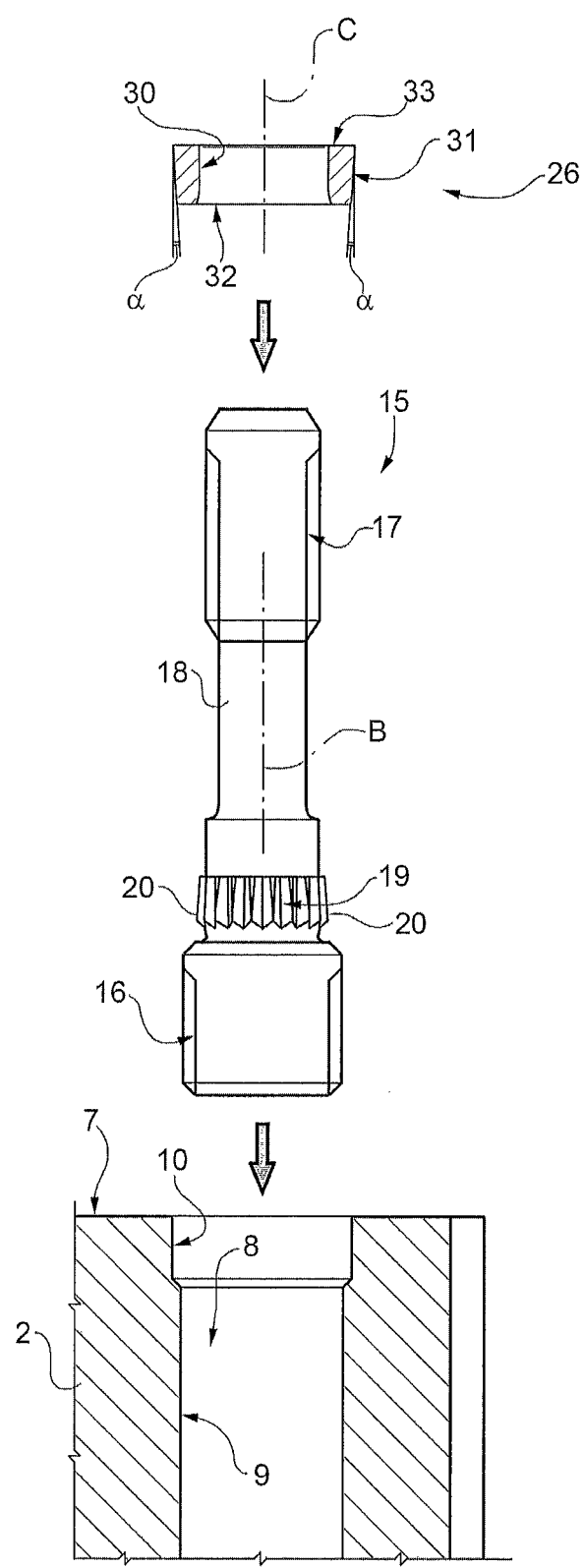
FIG. 6 shows the sequence in which the FIGS. 1 and 5 threaded stud and the FIG. 2-4 lock ring are assembled to a housing.

At this point, ring 26 is inserted inside seat 10, as shown in FIG. 6, proceeding from thread 17 to thread 16, and first inserting surfaces 32 and 33 so that axis C of ring 26 coincides with axis B of threaded stud 15.

Before being inserted inside seat 10, surface 30 of ring 26 has no impression 27, i.e. is smooth.

More specifically, surface 32 and half 41 of surface 31 are inserted manually inside seat 10, until surface 31 interferes with seat 10.

Next, using an appropriate tool, axial force is exerted on thread 16 in a direction parallel to axis C and towards housing 2.

As a result, ring 26 is inserted completely, and half 40 of ring 26 is fitted interferentially, inside seat 10.

More specifically, ring 26 is inserted inside seat 10 into a position in which surface 33 is housed inside seat 10 and at an axial distance g from wall 7, as shown in FIG. 7.

Given gap 35, fitting surface 31 tightly inside seat 10 causes ring 26 to flex circumferentially and tighten radially towards axis C.

As a result, surface 30 is pressed against toothed portion 19.

This pressure produces impression 27 on surface 30, on account of ring 26 being made of softer material, i.e. aluminium or magnesium, than the steel of threaded stud 15.

At this point, portion 18 is inserted loosely inside seat 14 on casing 3, and nut 25 is screwed onto thread 17 projecting from casing 3 on the opposite side to housing 2.

Friction between grooves 28 of impression 27 and teeth 20 of toothed portion 19, and between surface 31 and seat 10 on housing 2, prevents threaded stud 15 from rotating about axis C and with respect to housing 2 when screwing or unscrewing nut 25 to or from thread 17.

It is important to note that, once ring 26 is inserted inside seat 10, axes B and C coincide.

Moreover, in this condition, surface 31, radially outwards with respect to axis B, and toothed portion 19 are oppositely tapered, i.e. toothed portion 19 tapers from thread 16 to thread 17, and surface 31 tapers from thread 17 to thread 16.

The advantages of ring 26 and the method according to the present invention will be clear from the above description.

More specifically, ring 26, on the one hand, prevents threaded stud 15 from rotating about axis C when screwing or unscrewing nut 25, and, on the other, eliminates the drawbacks of toothed lock washers described in the introduction.

The Applicant, in fact, has observed that, even when nut 25 is torqued 3.5 times its tightening torque, friction between grooves 28 of impression 27 and teeth 20 of toothed portion 19, and between seat 10 and surface 31, prevents rotation of threaded stud 15, and substantially no radial slack with respect to axes B and C is formed between seat 10 and ring 26.

Moreover, in the event of damage to threaded stud 15, ring 26 can be removed easily by simply applying sufficient torque to unscrew threaded stud 15 (FIG. 9).

In which case, threaded stud 15 unscrews from the nut screw on housing 2, and pulls ring 26, parallel to axis C, out of seat 10.

Moreover, ring 26 is made of the same material as housing 2, thus safeguarding against corrosion of housing 2.

The fact that surface 31 of ring 26 does not cut into the surface of seat 10 on housing 2 also reduces the risk of microcracks forming in housing 2.

These advantages are especially important in the aircraft industry, in view of the high cost of housings 2 in these applications.

The Applicant has also observed that, when replacing threaded stud 15, the same ring 26 may be used repeatedly, by not being damaged when removed from seat 10.

Ring 26 also eliminates the need for cadmium-plated parts, such as the steel lock washer described in the introduction, and so avoids contaminating the environment with cadmium-plated waste.

Clearly, changes may be made to ring 26 and the method described herein, without departing from the scope of the present invention.

The invention claimed is:

1. A connection assembly (1) comprising:
    a first member and second member (2, 3);
    a threaded stud (15) for connecting said first and second member (2, 3); and
    a lock ring (26) for securing said threaded stud (15) to said first member (2); said threaded stud (15) comprising:
        a first thread (16) which may screw onto said first member (2) for connection;
        a second thread (17) onto which a tightening member (25) may screw; and
        a non-threaded portion (18) interposed between said first and second thread (16, 17), which fits loosely through the second member (3) for connection;
    said lock ring (26) comprising:
        an axial upper portion (40) and an axial lower portion (41);
        a first surface (30) defining said lock ring (26) on a side facing a first axis (C) of symmetry of said lock ring (26); and
        a second surface (31) defining said lock ring (26) on an opposite side to said first axis (c) and being tapered inwardly from said axial upper portion (40) to said axial lower portion (41);
    characterized in that said first surface (30) is smooth before being inserted inside said first member (2), and a toothed impression (27) is formed in said first surface (30) when said lock ring (26) is forced onto a toothed portion (19) of said threaded stud (15);
    said second surface (31) being conical and adapted to be forced inside said first member (2) such that only said axial upper portion (40) interferes with said first member (2); and
    a third surface of said toothed portion (19) of said stud (15), radially outwards with respect to an axis (B) of said threaded stud (15), being conical and oppositely tapered from said second surface (31), and forming said toothed impression (27) on said first surface (30) of said lock ring (26) when said second surface (31), opposite said first surface (30), of said lock ring (26) is forced inside said first member (2).

2. A connection assembly as claimed in claim 1, characterized in that said second surface (31) is symmetrical with respect to said first axis (C).

3. A connection assembly as claimed in claim 1, characterized in that at least one of said first and second surfaces (30, 31) comprises a gap (35) eccentric with respect to said first axis (C).

4. A connection assembly as claimed in claim 3, characterized in that said gap (35) comprises a cut (35) through said first and second surfaces (30, 31) and radial with respect to said first axis (C).

5. A connection assembly as claimed in claim 4, characterized in that said cut (35) extends through said first and second surfaces (30, 31) along the whole axial length of said ring (26).

6. A connection assembly as claimed in claim 4, characterized in that said cut (35) extends along a second axis (D) parallel to said first axis (C).

7. A connection assembly as claimed in claim 1, characterized by said ring (26) being made of aluminium or magnesium.

8. A connection assembly as claimed in claim 1, characterized in that said threaded stud (15) extends along said axis (B), and in that said toothed portion (19) is symmetrical with respect to said axis (B).

9. A connection assembly as claimed in claim 1, characterized in that said first member (2) comprises a cylindrical seat (10) symmetrical with respect to said first axis (C) and into which said second surface (31) of said ring (26) is forced;
    the maximum nominal diameter of said second surface (31) being greater than the nominal diameter of said seat (10).

10. A connection assembly according to claim 1, characterized in that said ring (26) is made by a material softer than the material of said threaded stud (15).

* * * * *